UNITED STATES PATENT OFFICE.

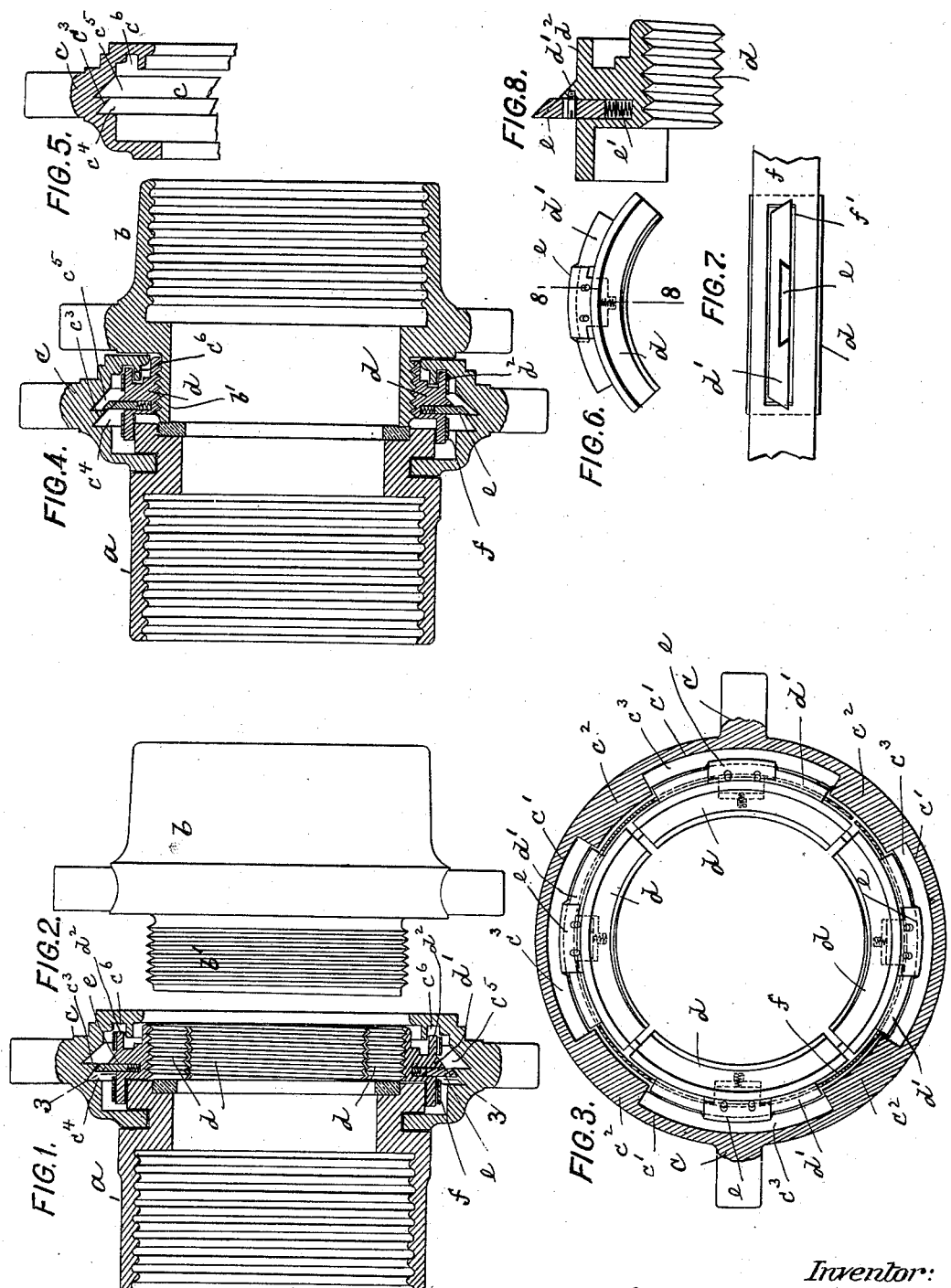

JAMES M. COX, OF NEW YORK, N. Y., ASSIGNOR TO UNITED STATES COUPLER AND MANUFACTURING COMPANY, OF EAST ORANGE, NEW JERSEY, A CORPORATION OF NEW JERSEY.

SCREW-COUPLING.

SPECIFICATION forming part of Letters Patent No. 686,388, dated November 12, 1901.

Application filed April 2, 1901. Serial No. 54,032. (No model.)

*To all whom it may concern:*

Be it known that I, JAMES M. COX, a citizen of the United States, and a resident of New York city, county and State of New York, have invented certain new and useful Improvements in Screw-Couplings, of which the following is a specification.

This invention relates to a screw-coupling of the class in which the nut or female member is made expansible, so that a rapid union by an axial movement of the male member into the female member is effected.

The object of the invention is to securely interlock the members after they have been thus preliminarily coupled, so that a separation, even under excessive strain, is prevented.

The invention consists in the means for so locking the expansible nut by a rotatory movement that it cannot slip either axially or radially upon the male member of the coupling.

In the accompanying drawings, Figure 1 is a longitudinal central section of the female member of a hose-coupling embodying my invention. Fig. 2 is a side elevation of the male member. Fig. 3 is a cross-section mainly on line 3 3, Fig. 1; Fig. 4, a longitudinal section of the coupling, showing it closed; Fig. 5, a section through the rim of the collar $c$; Fig. 6, a side view of one of the nut-sections; Fig. 7, an end view thereof; and Fig. 8, an enlarged cross-section on line 8 8, Fig. 6.

The letters $a$ and $b$ represent the two members of a coupling to which the hose or the nozzle is adapted to be attached in suitable manner. The member $a$ is provided with a rotatable collar $c$, on the inner face of which are formed a number of radially-extending chambers or recesses $c'$, Fig. 3, separated by the radial partitions $c^2$.

The collar $c$ incloses the expanding nut, which constitutes the female member of the coupling. This member is composed of a number of curved threaded sections $d$, Fig. 6, each of which is provided with a radially-extending flange $d'$, adapted to project partly into one of the recesses $c'$, Fig. 3. The nut-sections $d$ are movable axially within the collar $c$, but are by the engagement of the parts $c'$ $d'$ held against circumferential displacement.

Each chamber $c'$ is divided by a circumferential rib $c^3$ into an inner circumferential compartment $c^4$ and an outer circumferential compartment $c^5$, Fig. 5, the rib $c^3$ having a beveled edge along compartment $c^4$ and a straight edge along compartment $c^5$. The compartments $c^4$ $c^5$ are adapted to receive a latch $e$, carried by each nut-section $d$ and projected beyond the flange $d'$ by means of a spring $e'$, Fig. 8.

An inwardly-extending groove $c^6$ at the base of collar $c$ is adapted to receive the outwardly-projecting flanges $d^2$ of the nut-sections $d$ when the nut-sections are in their outermost position.

A band-spring $f$, slotted at $f'$ to clear the projections $d$ and latches $e$, Fig. 7, surrounds the nut-sections $d$ and tends to contract the same against the male member of the coupling. Normally the nut-sections $d$ are set back from the outer edge of the collar $c$, Fig. 1, so that the latches $e$ engage the inner compartment $c^4$.

The male member $b$ of the coupling is provided with a screw $b'$, adapted to be thrust axially into the expanding nut or female section. After a preliminary coupling has been effected by this longitudinal movement the collar $c$ is rotated to screw the nut-sections $d$ outward or toward the open end of collar $c$. The force brought to bear upon the sections $d$ will cause the spring-latches $e$ to clear the beveled face of the rib $c^3$ and to enter the outer compartment $c^5$, Fig. 4, while at the same time the flange $d^2$ will be drawn into the groove $c^6$. In this way the expansible nut is locked firmly to the male member of the coupling and held against longitudinal and also against lateral displacement—that is, the latches $e$ will prevent the female section from slipping axially off the male section, while the flanges $d^2$, being held in the groove $c^6$, will prevent the nut from yielding radially. The coupling is therefore so firmly locked that a parting, even under excessive strain, will be prevented.

In case the coupling is used to unite a hose-section to a nozzle the collar $c$ need not be rotatable upon the member $a$, but may be fixed, because in that case the entire member carrying the nozzle may be rotated.

Though the invention has been shown to be embodied in a hose-coupling, it is evident that it may be applied to other implements and tools in which an expanding nut is employed.

What I claim is—

1. In a screw-coupling, the combination of a collar having a pair of circumferential compartments, with a sectional nut having latches adapted to engage either of said compartments, substantially as specified.

2. In a screw-coupling, the combination of a collar having a pair of circumferential compartments and an intermediate beveled rib, with a sectional nut having latches adapted to engage either of said compartments, substantially as specified.

3. In a screw-coupling, the combination of a collar having a pair of circumferential compartments, and a groove at its base, with a sectional nut having latches adapted to engage either of said compartments, and a flange adapted to engage the groove, substantially as specified.

4. In a screw-coupling, the combination of a collar having radial chambers, a pair of circumferential compartments and a groove, with a sectional nut having flanges adapted to engage the radial chambers, latches adapted to engage the circumferential compartments, and a flange adapted to engage the groove, substantially as specified.

Signed by me at New York city, county and State of New York, this 1st day of April, 1901.

JAMES M. COX.

Witnesses:
WILLIAM SCHULZ,
F. V. BRIESEN.